(12) United States Patent
Huxham et al.

(10) Patent No.: US 10,304,047 B2
(45) Date of Patent: May 28, 2019

(54) TOKEN GENERATING COMPONENT

(71) Applicant: Visa International Service Association, San Francisco, CA (US)

(72) Inventors: Horatio Nelson Huxham, Cape Town (ZA); Alan Joseph O'Regan, Cape Town (ZA); Hough Arie Van Wyk, Cape Town (ZA); Tara Anne Moss, Cape Town (ZA)

(73) Assignee: Visa International Service Association, San Francisco, CA (US)

( * ) Notice: Subject to any disclaimer, the term of this patent is extended or adjusted under 35 U.S.C. 154(b) by 790 days.

(21) Appl. No.: 14/648,510

(22) PCT Filed: Dec. 6, 2013

(86) PCT No.: PCT/IB2013/060696
§ 371 (c)(1),
(2) Date: May 29, 2015

(87) PCT Pub. No.: WO2014/087381
PCT Pub. Date: Jun. 12, 2014

(65) Prior Publication Data
US 2015/0302390 A1    Oct. 22, 2015

(30) Foreign Application Priority Data

Dec. 7, 2012    (ZA) ................... 2012/09284

(51) Int. Cl.
*G06Q 20/32*    (2012.01)
*G06F 21/35*    (2013.01)
(Continued)

(52) U.S. Cl.
CPC ......... *G06Q 20/3229* (2013.01); *G06F 21/35* (2013.01); *G06Q 20/327* (2013.01);
(Continued)

(58) Field of Classification Search
CPC ............. G06Q 20/3229; G06Q 20/327; G06Q 20/382; G06Q 20/206; G06Q 20/38215;
(Continued)

(56) References Cited

U.S. PATENT DOCUMENTS 4,423,287 A * 12/1983 Zeidler ................. G06Q 20/02
235/379
5,412,730 A *  5/1995 Jones ....................... H04L 9/12
380/262
(Continued)

FOREIGN PATENT DOCUMENTS

EP      2156397 A1    2/2010
WO    2001035304 A1    5/2001
(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
(Continued)

*Primary Examiner* — Edward Chang
*Assistant Examiner* — Slade E Smith
(74) *Attorney, Agent, or Firm* — Kilpatrick Townsend & Stockton LLP

(57) ABSTRACT

The invention provides a method and system for providing financial details from a mobile device of a user for use in a transaction. The method is performed on a mobile device of the user and includes the steps of generating, on a token generating component, a session-specific token by applying an algorithm requiring a dynamic key; providing financial details for use in a transaction; incorporating the session-specific token and the financial details into a modified form the financial details; and transferring the modified form of
(Continued)

the financial details from the mobile device to initiate the transaction. A corresponding method and system for validating financial details received, at a server of an issuing authority, is also provided.

20 Claims, 10 Drawing Sheets

(51) Int. Cl.
*G06Q 20/38* (2012.01)
*H04L 29/06* (2006.01)
*H04W 12/06* (2009.01)

(52) U.S. Cl.
CPC ......... *G06Q 20/382* (2013.01); *H04L 63/067* (2013.01); *H04L 63/068* (2013.01); *H04W 12/06* (2013.01); *G06F 2221/2137* (2013.01)

(58) Field of Classification Search
CPC ............... G06Q 20/40; G06Q 20/3278; G06Q 20/3827; G06Q 20/401; G06Q 20/10; G06Q 20/305; G06Q 20/32; G06Q 20/322; G06Q 20/3224; G06Q 20/3823; G06Q 20/385; G06Q 20/40145; G06Q 20/425; G06Q 2220/00; G06Q 20/20; G06Q 20/204; G06Q 20/3255; G06Q 20/36; G06Q 20/367; G06Q 20/3672; G06Q 20/3674; G06F 21/35; G06F 2221/2137; G06F 21/34; G06F 21/64; G06F 2221/2117; H04L 63/067; H04L 63/068; H04L 2209/56; H04L 9/3234; H04L 63/0853; H04L 63/168; H04L 9/0825; H04L 9/0869; H04L 9/0877; H04L 2209/805; H04L 63/0428; H04L 63/08; H04L 63/0846; H04L 63/107; H04L 67/306; H04W 12/06; H04W 12/04; H04W 12/02
USPC ............................................................. 705/67
See application file for complete search history.

(56) References Cited

U.S. PATENT DOCUMENTS

| | | | |
|---|---|---|---|
| 5,613,012 A | 3/1997 | Hoffman | |
| 5,781,438 A | 7/1998 | Lee | |
| 5,883,810 A | 3/1999 | Franklin | |
| 5,953,710 A | 9/1999 | Fleming | |
| 5,956,408 A * | 9/1999 | Arnold | G06F 21/10 713/1 |
| 5,956,699 A | 9/1999 | Wong | |
| 6,000,832 A | 12/1999 | Franklin | |
| 6,014,635 A | 1/2000 | Harris | |
| 6,044,360 A | 3/2000 | Picciallo | |
| 6,058,193 A * | 5/2000 | Cordery | G07B 17/00435 380/277 |
| 6,112,187 A * | 8/2000 | Fukawa | G06Q 20/206 705/18 |
| 6,163,771 A | 12/2000 | Walker | |
| 6,227,447 B1 | 5/2001 | Campisano | |
| 6,236,981 B1 | 5/2001 | Hill | |
| 6,267,292 B1 | 7/2001 | Walker | |
| 6,327,578 B1 | 12/2001 | Linehan | |
| 6,341,724 B2 | 1/2002 | Campisano | |
| 6,385,596 B1 | 5/2002 | Wiser | |
| 6,422,462 B1 | 7/2002 | Cohen | |
| 6,425,523 B1 | 7/2002 | Shem Ur | |
| 6,592,044 B1 | 7/2003 | Wong | |
| 6,636,833 B1 | 10/2003 | Flitcroft | |
| 6,667,700 B1 * | 12/2003 | McCanne | H03M 7/30 341/50 |
| 6,748,367 B1 | 6/2004 | Lee | |
| 6,805,287 B2 | 10/2004 | Bishop | |
| 6,879,965 B2 | 4/2005 | Fung | |
| 6,891,953 B1 | 5/2005 | DeMello | |
| 6,901,387 B2 | 5/2005 | Wells | |
| 6,931,382 B2 | 8/2005 | Laage | |
| 6,938,019 B1 | 8/2005 | Uzo | |
| 6,941,285 B2 | 9/2005 | Sarcanin | |
| 6,980,670 B1 | 12/2005 | Hoffman | |
| 6,990,470 B2 | 1/2006 | Hogan | |
| 6,991,157 B2 | 1/2006 | Bishop | |
| 6,996,722 B1 * | 2/2006 | Fairman | G06F 21/10 380/239 |
| 7,011,247 B2 * | 3/2006 | Drabczuk | G06K 7/0008 235/441 |
| 7,051,929 B2 | 5/2006 | Li | |
| 7,069,249 B2 | 6/2006 | Stolfo | |
| 7,069,439 B1 * | 6/2006 | Chen | G06F 21/34 380/251 |
| 7,103,576 B2 | 9/2006 | Mann, III | |
| 7,113,930 B2 | 9/2006 | Eccles | |
| 7,136,835 B1 | 11/2006 | Flitcroft | |
| 7,177,835 B1 | 2/2007 | Walker | |
| 7,177,848 B2 | 2/2007 | Hogan | |
| 7,194,437 B1 | 3/2007 | Britto | |
| 7,209,561 B1 | 4/2007 | Shankar et al. | |
| 7,213,766 B2 * | 5/2007 | Ryan | G06F 13/385 235/472.02 |
| 7,264,154 B2 | 9/2007 | Harris | |
| 7,287,692 B1 | 10/2007 | Patel | |
| 7,292,999 B2 | 11/2007 | Hobson | |
| 7,350,230 B2 | 3/2008 | Forrest | |
| 7,353,382 B2 | 4/2008 | Labrou | |
| 7,379,919 B2 | 5/2008 | Hogan | |
| RE40,444 E | 7/2008 | Linehan | |
| 7,415,443 B2 | 8/2008 | Hobson | |
| 7,430,668 B1 * | 9/2008 | Chen | G06F 11/2289 713/1 |
| 7,444,676 B1 | 10/2008 | Asghari-Kamrani | |
| 7,469,151 B2 | 12/2008 | Khan | |
| 7,548,889 B2 | 6/2009 | Bhambri | |
| 7,567,934 B2 | 7/2009 | Flitcroft | |
| 7,567,936 B1 | 7/2009 | Peckover | |
| 7,571,139 B1 | 8/2009 | Giordano | |
| 7,571,142 B1 | 8/2009 | Flitcroft | |
| 7,580,898 B2 | 8/2009 | Brown | |
| 7,584,153 B2 | 9/2009 | Brown | |
| 7,593,896 B1 | 9/2009 | Flitcroft | |
| 7,606,560 B2 | 10/2009 | Labrou | |
| 7,627,531 B2 | 12/2009 | Breck | |
| 7,627,895 B2 | 12/2009 | Gifford | |
| 7,650,314 B1 | 1/2010 | Saunders | |
| 7,685,037 B2 | 3/2010 | Reiners | |
| 7,702,578 B2 | 4/2010 | Fung | |
| 7,707,120 B2 | 4/2010 | Dominguez | |
| 7,712,655 B2 | 5/2010 | Wong | |
| 7,734,527 B2 | 6/2010 | Uzo | |
| 7,753,265 B2 | 7/2010 | Harris | |
| 7,770,789 B2 | 8/2010 | Oder, II | |
| 7,784,685 B1 | 8/2010 | Hopkins, III | |
| 7,793,851 B2 | 9/2010 | Mullen | |
| 7,801,826 B2 | 9/2010 | Labrou | |
| 7,805,376 B2 | 9/2010 | Smith | |
| 7,805,378 B2 | 9/2010 | Berardi | |
| 7,818,264 B2 | 10/2010 | Hammad | |
| 7,828,220 B2 | 11/2010 | Mullen | |
| 7,835,960 B2 | 11/2010 | Breck | |
| 7,841,523 B2 | 11/2010 | Oder, II | |
| 7,841,539 B2 | 11/2010 | Hewton | |
| 7,844,550 B2 | 11/2010 | Walker | |
| 7,848,980 B2 | 12/2010 | Carlson | |
| 7,849,020 B2 | 12/2010 | Johnson | |
| 7,853,529 B1 | 12/2010 | Walker | |
| 7,853,995 B2 | 12/2010 | Chow | |
| 7,865,414 B2 | 1/2011 | Fung | |
| 7,873,579 B2 | 1/2011 | Hobson | |
| 7,873,580 B2 | 1/2011 | Hobson | |
| 7,874,010 B1 * | 1/2011 | Perlman | G06F 21/6209 380/264 |

(56) References Cited

U.S. PATENT DOCUMENTS

| | | |
|---|---|---|
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,078,593 B1 * | 12/2011 | Ramarao ............... G06F 3/0671 707/692 |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,295 B1 * | 2/2012 | Everson ................ H04L 63/061 380/278 |
| 8,121,942 B2 | 2/2012 | Carlson |
| 8,121,956 B2 | 2/2012 | Carlson |
| 8,126,449 B2 | 2/2012 | Beenau |
| 8,151,345 B1 * | 4/2012 | Yeager ................. G06Q 20/367 235/375 |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,307,210 B1 * | 11/2012 | Duane .................. H04L 9/0897 380/42 |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,271,110 B1 * | 2/2016 | Fultz .................... H04W 64/00 |
| 9,280,765 B2 | 3/2016 | Hammad |
| 9,530,137 B2 | 12/2016 | Weiss |
| 9,860,245 B2 * | 1/2018 | Ronda ................. H04L 9/3213 |
| 9,911,117 B1 * | 3/2018 | Everhart ........... G06Q 20/0855 |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2002/0184511 A1 * | 12/2002 | Kolouch ................ G06Q 40/02 713/189 |
| 2003/0028481 A1 | 2/2003 | Flitcroft |
| 2003/0084292 A1 * | 5/2003 | Pierce .................. G06F 21/606 713/168 |
| 2003/0130955 A1 | 7/2003 | Hawthorne |
| 2003/0191709 A1 | 10/2003 | Elston |
| 2003/0191945 A1 | 10/2003 | Keech |
| 2003/0212894 A1 * | 11/2003 | Buck ...................... G06F 21/34 713/184 |
| 2004/0010462 A1 | 1/2004 | Moon |
| 2004/0034783 A1 * | 2/2004 | Fedronic ................ G06F 21/32 713/186 |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0069171 A1 * | 3/2005 | Rhoads ................. G06Q 30/02 382/100 |
| 2005/0080730 A1 | 4/2005 | Sorrentino |

(56) References Cited

U.S. PATENT DOCUMENTS

| | | |
|---|---|---|
| 2005/0108178 A1 | 5/2005 | York |
| 2005/0137983 A1* | 6/2005 | Bells .................. G06F 21/10 |
| | | 705/51 |
| 2005/0140964 A1* | 6/2005 | Eschenauer ......... H04L 63/1408 |
| | | 356/10 |
| 2005/0154923 A1* | 7/2005 | Lok .................... H04L 63/0428 |
| | | 726/19 |
| 2005/0166263 A1* | 7/2005 | Nanopoulos ............ G06F 21/31 |
| | | 726/7 |
| 2005/0190914 A1* | 9/2005 | Chen .................... G06K 19/08 |
| | | 380/201 |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2005/0283441 A1 | 12/2005 | Ekberg |
| 2006/0075254 A1* | 4/2006 | Henniger ............. G06Q 20/341 |
| | | 713/184 |
| 2006/0235795 A1 | 10/2006 | Johnson |
| 2006/0237528 A1 | 10/2006 | Bishop |
| 2006/0255158 A1* | 11/2006 | Margalit ................ G06K 19/04 |
| | | 235/492 |
| 2006/0278704 A1 | 12/2006 | Saunders |
| 2006/0287965 A1* | 12/2006 | Bajan .................. G06Q 20/02 |
| | | 705/75 |
| 2006/0288216 A1* | 12/2006 | Buhler ................. H04L 9/3234 |
| | | 713/176 |
| 2007/0066398 A1* | 3/2007 | Rowan .................... G07F 17/32 |
| | | 463/42 |
| 2007/0067833 A1* | 3/2007 | Colnot ................ H04L 9/3271 |
| | | 726/9 |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0143227 A1* | 6/2007 | Kranzley ............. G06Q 20/02 |
| | | 705/67 |
| 2007/0150942 A1* | 6/2007 | Cartmell ................ G06F 21/34 |
| | | 726/5 |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0262138 A1* | 11/2007 | Somers ................. G06Q 20/341 |
| | | 235/380 |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0148057 A1* | 6/2008 | Hauw .................... G06F 21/34 |
| | | 713/185 |
| 2008/0172738 A1* | 7/2008 | Bates ................. G06F 17/30887 |
| | | 726/22 |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0060184 A1* | 3/2009 | Alten ................. H04L 63/0428 |
| | | 380/255 |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0313318 A1* | 12/2009 | Dye ..................... G06Q 30/00 |
| | | 709/202 |
| 2009/0327131 A1 | 12/2009 | Beenau |
| 2010/0008535 A1 | 1/2010 | Abulafia |
| 2010/0017867 A1* | 1/2010 | Fascenda ............ H04L 63/0823 |
| | | 726/9 |
| 2010/0024024 A1* | 1/2010 | Siourthas ................ G06F 21/35 |
| | | 726/9 |
| 2010/0077216 A1* | 3/2010 | Kramer .................... H04L 9/002 |
| | | 713/172 |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0289627 A1* | 11/2010 | McAllister ........... G06Q 10/087 |
| | | 340/10.42 |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0103586 A1* | 5/2011 | Nobre ................. H04L 63/0853 |
| | | 380/270 |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0154467 A1* | 6/2011 | Bomar .................. G06F 21/335 |
| | | 726/9 |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0191592 A1* | 8/2011 | Goertzen ................ G06F 21/36 |
| | | 713/182 |
| 2011/0197070 A1* | 8/2011 | Mizrah ................ H04L 63/0869 |
| | | 713/176 |
| 2011/0237224 A1* | 9/2011 | Coppinger ............. G06Q 20/20 |
| | | 455/411 |
| 2011/0238511 A1 | 9/2011 | Park |
| 2011/0238573 A1 | 9/2011 | Varadarajan |
| 2011/0246317 A1 | 10/2011 | Coppinger |

(56) References Cited

U.S. PATENT DOCUMENTS

| | | |
|---|---|---|
| 2011/0251892 A1 | 10/2011 | Laracey |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2011/0307699 A1* | 12/2011 | Fielder .................. H04L 63/123 713/172 |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0060025 A1* | 3/2012 | Cahill ...................... H04L 63/10 713/155 |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0110318 A1* | 5/2012 | Stone ...................... H04L 9/3234 713/150 |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0179952 A1* | 7/2012 | Tuyls ...................... G06F 21/73 714/768 |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0203700 A1* | 8/2012 | Ornce ................ G06Q 20/3278 705/67 |
| 2012/0215688 A1 | 8/2012 | Musser |
| 2012/0215696 A1 | 8/2012 | Salonen |
| 2012/0221421 A1 | 8/2012 | Hammad |
| 2012/0221859 A1 | 8/2012 | Marien |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0047263 A1* | 2/2013 | Radhakrishnan ... H04L 63/0807 726/27 |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0085944 A1* | 4/2013 | Fielder ................ G06Q 20/206 705/67 |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0159195 A1* | 6/2013 | Kirillin ................ G06Q 20/322 705/71 |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0226815 A1* | 8/2013 | Ibasco ................ H04L 9/3234 705/71 |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0290719 A1* | 10/2013 | Kaler ...................... G06F 21/41 713/168 |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0326602 A1* | 12/2013 | Chen .................... H04L 9/3255 726/6 |
| 2013/0332344 A1 | 12/2013 | Weber |
| 2013/0339253 A1 | 12/2013 | Sincai |

(56) References Cited

U.S. PATENT DOCUMENTS

| | | |
|---|---|---|
| 2013/0346314 A1 | 12/2013 | Mogollon |
| 2014/0004817 A1* | 1/2014 | Horton .................. H04L 67/12 455/405 |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0019364 A1* | 1/2014 | Hurry .................... G06F 21/33 705/67 |
| 2014/0019752 A1* | 1/2014 | Yin .................... H04L 63/0435 713/155 |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0082366 A1* | 3/2014 | Engler .................. H04L 9/3226 713/176 |
| 2014/0108172 A1 | 4/2014 | Weber et al. |
| 2014/0114857 A1 | 4/2014 | Griggs et al. |
| 2014/0136418 A1* | 5/2014 | Fielder .................. G06Q 20/206 705/65 |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0128243 A1* | 5/2015 | Roux .................... H04L 9/0877 726/9 |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0224976 A1 | 8/2016 | Basu |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor |

FOREIGN PATENT DOCUMENTS

| | | |
|---|---|---|
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | WO2012064280 A1 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Wang, U.S. Appl. No. 62/000,288 (unpublished), Payment System Canonical Address Format filed May 19, 2014.
Sharma et al., U.S. Appl. No. 62/003,717 (unpublished), Mobile Merchant Application filed May 28, 2014.
Kalgi et al., U.S. Appl. No. 62/024,426, (unpublished) Secure Transactions Using Mobile Devices filed Jul. 14, 2014.
Prakash et al., U.S. Appl. No. 62/037,033 (unpublished), Sharing Payment Token filed Aug. 13, 2014.
Hoverson et al., U.S. Appl. No. 62/038,174 (unpublished), Customized Payment Gateway filed Aug. 15, 2014.
Wang, U.S. Appl. No. 62/042,050 (unpublished), Payment Device Authentication and Authorization System filed Aug. 26, 2014.
Gaddam et al., U.S. Appl. No. 62/053,736 (unpublished), Completing Transactions Without a User Payment Device filed Sep. 22, 2014.
Patterson, U.S. Appl. No. 62/054,346 (unpublished), Mirrored Token Vault filed Sep. 23, 2014.
Dimmick, U.S. Appl. No. 14/952,514 (unpublished), Systems Communications With Non-Sensitive Identifiers filed Nov. 25, 2015.
Dimmick, U.S. Appl. No. 14/952,444 (unpublished), Tokenization Request Via Access Device filed Nov. 25, 2015.
Prakash et al., U.S. Appl. No. 14/955,716 (unpublished), Provisioning Platform for Machine-To-Machine Devices filed Dec. 1, 2015.
Wong et al., U.S. Appl. No. 14/966,948 (unpublished), Automated Access Data Provisioning filed Dec. 11, 2015.
Stubbs et al., U.S. Appl. No. 62/103,522 (unpublished), Methods and Systems for Wallet Provider Provisioning filed Jan. 14, 2015.
McGuire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.

(56) References Cited

OTHER PUBLICATIONS

Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., , U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
International Search Report dated Apr. 1, 2014 in PCT/IB2013/060696, 3 pages.
Chipman, et al., U.S. Appl. No. 15/265,282 (Unpublished), Self-Cleaning Token Vault, filed Sep. 14, 2016.
Lopez, et al., U.S. Appl. No. 15/462,658 (Unpublished), Replacing Token on a Multi-Token User Device, filed Mar. 17, 2017.

* cited by examiner

TOKEN GENERATING COMPONENT

CROSS-REFERENCES TO RELATED APPLICATIONS

This application is a National Stage of International Application No. PCT/IB2013/060696, International Filing Date Dec. 6, 2013, and which claims the benefit of South African Patent Application No. 2012/09284, filed Dec. 7, 2012, the disclosures of both applications being incorporated herein by reference.

BACKGROUND

This invention relates to a device, system and method for generating tokens for security purposes.

Many applications utilize token generation to enhance security through the provision of session specific tokens. Token generators often require a user to carry hardware with them, such as key fobs, cards, or USB devices, which are required for the generation of the session specific token. Carrying such devices may be inconvenient to a user.

The abovementioned hardware-type token generators often use time-based encryption, wherein the current time upon generation of a session-specific token is used as an input value to the algorithm used. The use of a time as an input value is an example of dynamic key use, where a continuously changing (dynamic) key is used as an input value to the algorithm used for determining the session specific token. A dynamic key ensures that the algorithm will provide a different result each time that the result of the algorithm is determined. If the same input value is used more than once in a token generating device which utilizes a single algorithm, the same result will be obtained. By including a dynamic input value, a different result should be obtained after each calculation.

A major problem which is often encountered with hardware-type token generators which use time as an input value is that the clock which provides the time to the hardware has to be synchronized with the clock of a service provider who has to check the validity of a generated token. Should the clocks not be synchronized, a validly generated token may not be recognized as valid when it is checked by a service provider with a clock that is out-of-sync to the clock of the hardware.

Mobile banking involves the use of a mobile device to pay for goods or services at a point-of-sale (POS) of a merchant, or even remotely. Mobile payments, in turn, refer to payment services performed with the use of a mobile device. Examples of mobile payments include situations in which details of a person's financial transaction card, such as a debit or credit card, is stored on the person's mobile device, typically in the format of Track 1 or Track 2 card data. Track 1 and Track 2 are standardized formats in which properties of a financial transaction card are stored on the cards themselves.

The mobile device transfers the details of a person's financial transaction card to a POS terminal of a merchant where a user wishes to transact, for example by means of near-field communications technology. The POS terminal, in turn, transmits the details to an issuing authority that is to approve or deny payment from an account of the user held by the issuing authority. Security concerns do however still exist with regards to mobile payments, for example regarding the possibility of the interception of the details during its transfer, or the access protection offered by the mobile device with regards to the payments cards stored thereon.

BRIEF SUMMARY

In accordance with an embodiment of the invention there is provided a method for providing financial details from a mobile device of a user for use in a transaction, the method being performed on a mobile device of the user and including the steps of:

generating, on a token generating component associated with the mobile device, a session-specific token by applying an algorithm stored on the token generating component with a dynamic key;

providing financial details in a pre-determined format for use in a transaction;

incorporating the session-specific token and the financial details into a modified form of the financial details; and transferring the modified form of the financial details in the pre-determined format from the mobile device to initiate the transaction.

Further features of the invention provide for the step of incorporating the session-specific token and the financial details into a modified form of the financial details to include inserting the session-specific token into redundant characters in the pre-determined format; and to include encrypting a portion of the characters of the financial details with the session-specific token.

Still further features of the invention provide for the algorithm stored on the token generating component to include an individual seed value for a customer; and for the modified form of the financial details to include a readable customer identifier.

Yet further features of the invention provide for the algorithm stored on the token generating component to include a seed value for an issuing authority; and for the modified form of the financial details to include a readable issuing authority identifier and an initiation vector.

In one embodiment of the invention, the dynamic key acts as the seed value. In a further embodiment, the user has a unique seed value, and the issuing authority has a database storing details relating to customer's respective unique seed values.

Further features of the invention provide for the step of generating, on a token generating component associated with the mobile device, a session-specific token by applying an algorithm stored on the token generating component with a dynamic key, generates the session-specific token offline from an issuing authority and the dynamic key is coordinated between the mobile device and the issuing authority.

A still further feature of the invention provides for the session-specific token to be generated without a communication channel to a issuing authority that is to verify the validity of the token, the issuing authority able to determine the session-specific token used, and its validity.

A yet further feature of the invention provides for the dynamic key and one of a customer identifier or an initialization vector for a customer to enable the session-specific token to be reversed by an issuing authority to authenticate a customer.

A further feature of the invention provides for the financial details to include static customer account details or one-time generated customer account details.

Still further features of the invention provide for the dynamic key to be randomly selected from a pre-calculated set of keys; and for a key serial number related to the dynamic key to be transferred along with the modified form of the financial details, wherein the key serial number is able to determine the dynamic key that was used.

Yet further features of the invention provide for the dynamic key to be a counter value which increments or changes every time the algorithm is applied; or to be a based on a time signal derived by the mobile device and at which the generation of the session-specific token is carried out.

Still further features of the invention provide for the session-specific token to be inserted in redundant characters in the pre-determined format; for the format to be compatible with a POS terminal; for the format to be the Track 1 or Track 2 data format of a financial transaction card; and for the session-specific token to be inserted at least partially in any one or more of a field normally reserved for an expiration date, a card security code, a service code, discretionary data, or a name. In one embodiment of the invention, the token is inserted into the card security code only, and the card security code can be described as a dynamic card security code.

In one embodiment of the invention, the financial details are transferred to a point-of-sale (POS) terminal of a merchant, from where it is further transferred to the issuing authority.

Further features of the invention provide for the token generating component to be a cryptographic expansion device that can be attached to a communication component of the mobile device; and for the cryptographic expansion device to be configured to be used with the mobile device without requiring any changes to the internal software or hardware of the mobile device and without requiring any modification to the communication protocols used by the mobile device.

The invention further extends to the cryptographic expansion device being a cryptographic label that includes a hardware security module (HSM) disposed therein including a secure processing unit and a public processing unit.

In one embodiment of the invention, the cryptographic label also includes a first set of electrical contacts disposed on the top side of the cryptographic label for interfacing to a mobile device, and a second set of electrical contacts disposed on the bottom side of the cryptographic label for interfacing to a communication component. A coupling element may also be provided to attach the cryptographic label to the communication component. In an exemplary embodiment, the mobile device can be a mobile phone, the communication component can be a subscriber identity module (SIM) card, and the coupling element used for attaching the cryptographic label to the communication component can be an adhesive material disposed on the cryptographic label.

The invention extends to a method for determining the validity of financial details, the method being performed at a server and including the steps of:

receiving a pre-determined format of financial details for a transaction;

extracting a session-specific token from the pre-determined format;

generating, on a token generating component associated with the server, at least one expected session-specific token by applying an algorithm with a dynamic key;

comparing the at least one expected session-specific token and the extracted session-specific token; and in response to the extracted session-specific token matching at least one expected session-specific token, approving the received financial details for use; or, in response to the extracted session-specific token matching none of the at least one expected session-specific tokens, rejecting the financial details for use.

A further feature of the invention provides for the step of extracting the session-specific token from the pre-determined format to include extracting the session-specific token from redundant characters in the pre-determined format.

Still further features of the invention provide for the algorithm stored on the token generating component to include an individual seed value for a customer; and for the received pre-determined format of financial details to include a readable customer identifier.

Yet further features of the invention provide for the algorithm stored on the token generating component to include a seed value for an issuing authority; and for the received pre-determined format of financial details to include a readable issuing authority identifier and an initialization vector.

Further features of the invention provide for the financial details to include static customer account details or one-time generated customer account details. In one embodiment, the pre-determined format may be a Track 1 or Track 2 data format of a financial transaction card.

Still further features of the invention provides for the financial details to include a serial number related to the dynamic key, the serial number providing an indication of the dynamic key used; the server having a database associated therewith which stores a list of keys and related serial numbers.

Yet further features of the invention provides for the server to be a server of an issuing authority at which a user has an account; and for financial details to be received from the mobile device of a user or a POS terminal of a merchant.

Further features of the invention provide for an expected session-specific token to be any token which may have been validly generated within a pre-determined amount of time; or to be any token which may have been validly generated a pre-determined amount of times since a previous transaction approval message has been transmitted.

A still further feature of the invention provides for the method to include the step of transmitting a transaction approval or a transaction rejection message to an electronic device of either the user or the merchant in response to the approval or rejection of the financial details for use.

The invention extends to a system for providing financial details from a mobile device of a user for use in a transaction, the system being provided on a mobile device of the user and including:

a token generating component associated with the mobile device for generating a session-specific token by applying an algorithm stored on the token generating component with a dynamic key;

a financial details component for providing financial details in a pre-determined format for use in a transaction a format modifying component for incorporating the session-specific token and the financial details into a modified form of the financial details; and a communication component for transferring the modified form of the financial details in the pre-determined format from the mobile device to initiate the transaction.

Further features of the invention provide for the format modifying component to incorporate the session-specific token and the financial details into a modified form of the financial details by inserting the session-specific token into redundant characters in the pre-determined format; or by encrypting a portion of the characters of the financial details with the session-specific token.

In one embodiment of the invention, the algorithm stored on the token generating component may include an individual seed value for a customer; and wherein the modified form of the financial details may include a readable customer identifier. In another embodiment, the algorithm stored on the token generating component may include a seed value for an issuing authority; and wherein the modified form of the financial details may include a readable issuing authority identifier and an initialization vector.

In one embodiment of the invention, the modified form of the financial details is transferred to a point-of-sale (POS) terminal of a merchant, from where it is further transferred to the issuing authority.

The invention extends to a mobile device having a hardware security module having a memory component for storing at least an algorithm, a seed value and a pre-determined format; and the token generating component applying the algorithm with input values including at least the seed value and a dynamic key.

Further features of the invention provide for the token generating component to be a cryptographic expansion device that can be attached to a communication component of the mobile device; and for the cryptographic expansion device to be configured to be used with the mobile device without requiring any changes to the internal software or hardware of the mobile device and without requiring any modification to the communication protocols used by the mobile device.

A still further feature of the invention provide for the cryptographic expansion device to be a cryptographic label that includes a hardware security module (HSM) disposed therein including a secure processing unit and a public processing unit.

In one embodiment of the invention, the cryptographic label also includes a first set of electrical contacts disposed on the top side of the cryptographic label for interfacing to a mobile device, and a second set of electrical contacts disposed on the bottom side of the cryptographic label for interfacing to a communication component. A coupling element may also be provided to attach the cryptographic label to the communication component. In an exemplary embodiment, the mobile device can be a mobile phone, the communication component can be a subscriber identity module (SIM) card, and the coupling element used for attaching the cryptographic label to the communication component can be an adhesive material disposed on the cryptographic label.

The invention extends to a system for determining the validity of financial details, the system being provided at a server and including:

a receiving component for receiving a pre-determined format of financial details for a transaction;

an extracting component for extracting a session-specific token from the pre-determined format;

a token generating component associated with the server for generating at least one expected session-specific token by applying an algorithm with a dynamic key;

a comparing component for comparing the at least one expected session-specific token and the extracted session-specific token; and in response to the extracted session-specific token matching at least one expected session-specific token, approving the received financial details for use; or, in response to the extracted session-specific token matching none of the at least one expected session-specific tokens, rejecting the financial details for use.

Further features of the invention provides for the server to be a server of an issuing authority at which a user has an account; and for financial details to be received from a POS terminal of a merchant.

A yet further feature of the invention provides for the system to include a transmission component for transmitting a transaction approval or a transaction rejection message to an electronic device of either the user or the merchant in response to the approval or rejection of the financial details for use.

The invention extends to a computer program product for providing financial details from a mobile device of a user for use in a transaction, the computer program product comprising a computer-readable medium having stored computer-readable program code for performing the steps of:

generating, on a token generating component associated with the mobile device, a session-specific token by applying an algorithm stored on the token generating component with a dynamic key;

providing financial details in a pre-determined format for use in a transaction;

incorporating the session-specific token and the financial details into a modified form of the financial details; and transferring the modified form of the financial details in the pre-determined format from the mobile device to initiate the transaction.

The invention further extends to a computer program product for determining the validity of financial details, the computer program product comprising a computer-readable medium having stored computer-readable program code for performing the steps of:

receiving a pre-determined format of financial details for a transaction;

extracting a session-specific token from the pre-determined format;

generating, on a token generating component associated with the server, at least one expected session-specific token by applying an algorithm with a dynamic key;

comparing the at least one expected session-specific token and the extracted session-specific token; and in response to the extracted session-specific token matching at least one expected session-specific token, approving the received financial details for use; or, in response to the extracted session-specific token matching none of the at least one expected session-specific tokens, rejecting the financial details for use.

DETAILED DESCRIPTION

Figure 1:
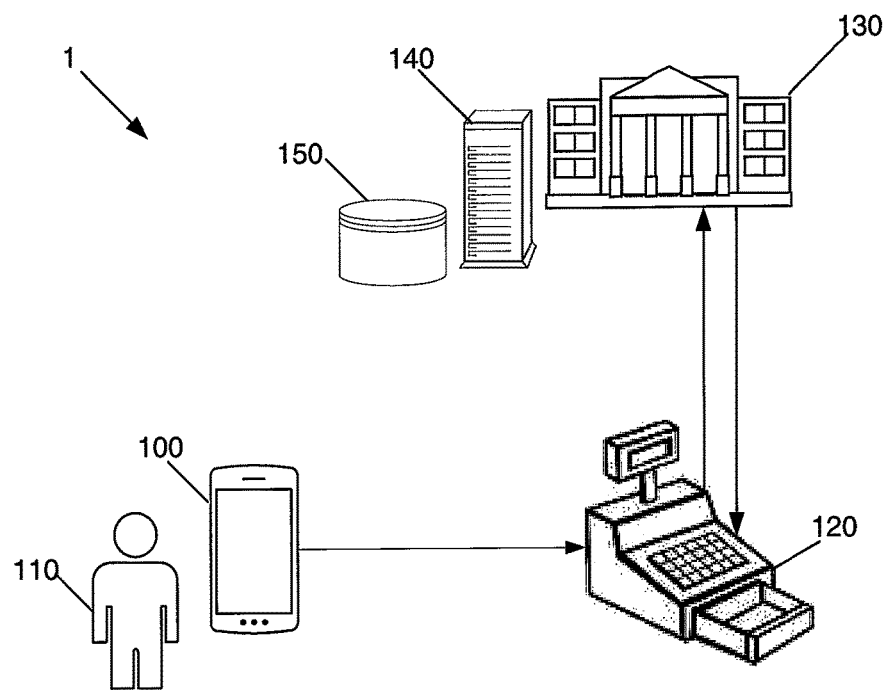
FIG. 1 is a system for providing financial details from a mobile device in accordance with an embodiment of the present invention.

FIG. 1 shows a system (1) for providing financial details from a mobile device. The system includes a mobile device (100) of a user (110), a point of sale terminal (120) of a merchant, and an issuing authority (130) at which the user (110) has an account. The issuing authority has associated therewith a server (140) and a database (150). In the present embodiment, the mobile device (100) is a smartphone, however the mobile device (100) may alternatively be a feature phone.

Figure 2:
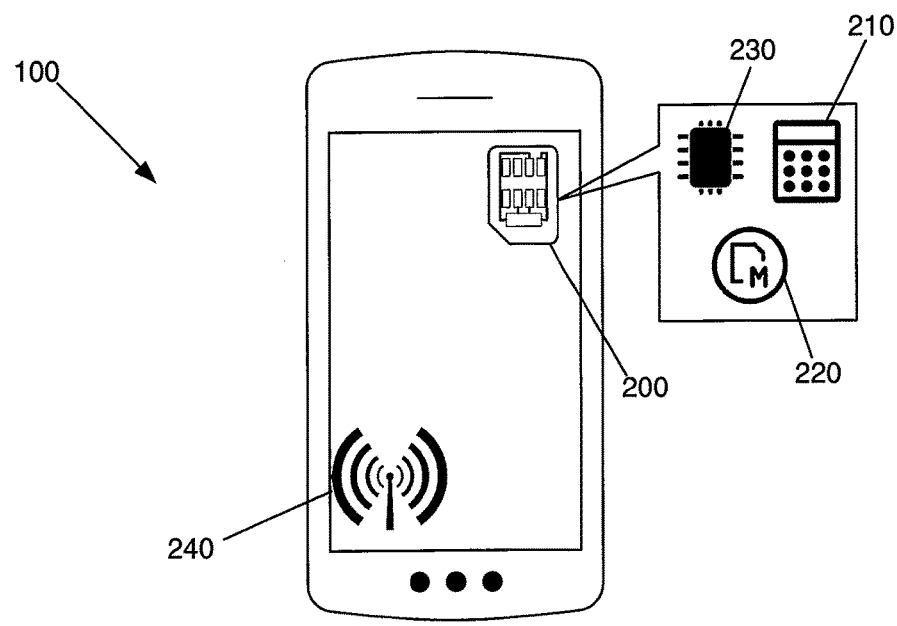
FIG. 2 is an embodiment of a mobile device of the system of FIG. 1 in accordance with the present invention.

The mobile device (100) of FIG. 1 is shown in more detail in FIG. 2. The mobile device includes an encryption component, in the present embodiment a hardware security module (HSM) (200). The HSM includes a token generating component (210), a financial details component, in the present embodiment a non-volatile memory module (220), and a format modifying component, in the present embodiment a processor (230). The mobile device also has a communication component (240) by means of which it can receive and send data.

In at least one embodiment of the invention, the mobile device differs from devices that may solely use software to encrypt communications between an electronic device and a target device or system. An electronic device that solely uses software to encrypt communications may comply with only a security level 1 of the Federal Information Processing Standard 140-2 (FIPS 140-2), which provides only a minimum level of security to protect sensitive information. In contrast, the HSM within an electronic device or controller according to some embodiments of the invention is compliant with at least a security level 2 of the FIPS 140-2 standard. More preferably, the HSM within the electronic device or controller in embodiments of the invention is compliant with security level 3 or level 4 of FIPS 140-2.

The HSM in embodiments of the invention uses hardware to encrypt data instead of solely performing the encryption in software. The HSM provides enhanced protection over software encryption technologies. For example, the HSM provides secure key management to generate cryptographic keys, sets the capabilities and security limits of keys, implements key backup and recovery, prepares keys for storage and performs key revocation and destruction. In some embodiments, the HSM is implemented as a dual processor device that includes a secure processor with storage and a public processor with storage. The HSM may also include a physical or logical separation between interfaces that are used to communicate critical security parameters and other interfaces that are used to communicate other data. The HSM can also provide a tamper-proof mechanism that provides a high risk of destroying the HSM and the cryptographic keys stored therein, if any attempt is made to remove or externally access the HSM.

Figure 3:
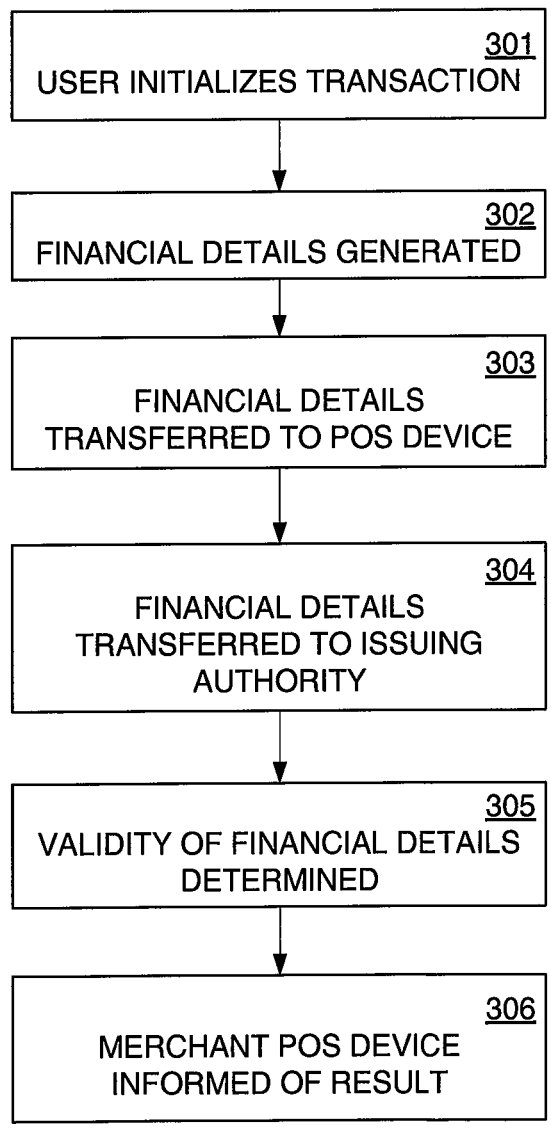
FIG. 3 a flow diagram of an embodiment of a method of operation of the system of FIG. 1.

FIG. 3 shows a flow diagram of an example operation of the system of FIG. 1. When a user (110) wishes to transact with a merchant, the user indicates on an input component of the mobile device (100), typically a keyboard, that he or she wishes to generate financial details required to complete the transaction in a first step (301). The financial details are generated on the mobile device (100) of the user (110) in a next step (302), and are transmitted to the POS terminal (120) in a further step (303). From the POS terminal (120), the details are transmitted to the issuing authority (130) at which the user has an account in a next step (304). At the issuing authority (130), the validity of the financial details is verified in a next step (305). Finally, the merchant is informed of the result of the verification of the details in a final step (306).

The financial details are presented in a format compliant with POS devices. In the present embodiment of the invention, that format is Track 2 financial transaction card format. By using a data format that a point of sale device is used to handling, the least number of modifications need to be made to currently in-use POS terminals and transmission protocols to allow them to facilitate the operation of the invention.

Figure 4:
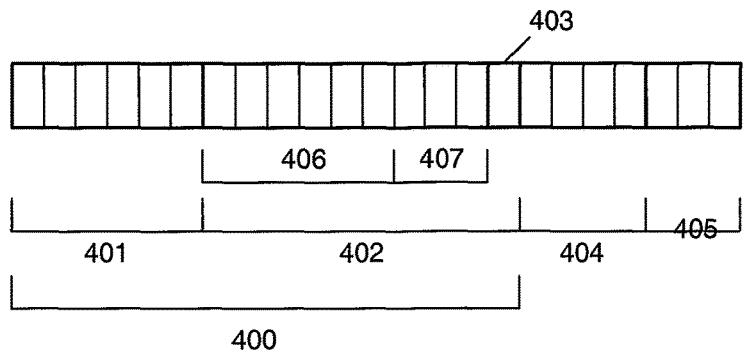
FIG. 4 is an example of a financial detail structure used in the method of FIG. 3.

Track 2 financial transaction card data include a number of digits in a pre-determined format. An example of data included in Track 2 data is shown in FIG. 4. The data includes a personal account number (PAN) field (400), which is made up of a bank identification number (BIN) field (401) of 6 characters and an account number field (402) of the user, of 10 characters. A BIN is an identifier of an institution who issued the financial data, such as an issuing authority, or of an issuing authority at which a user has an account. The account number includes a check digit (403) of a single character. Also included in the Track 2 data is an expiry date field (404) of 4 characters and a card verification value (CVV) field (405) of 3 characters. It should be noted that FIG. 4 only shows an extract of the data fields in Track 2 data, and that the actual format includes various other fields, such as field separators, and initialization fields, a termination field, as well as other data fields.

Figure 5:
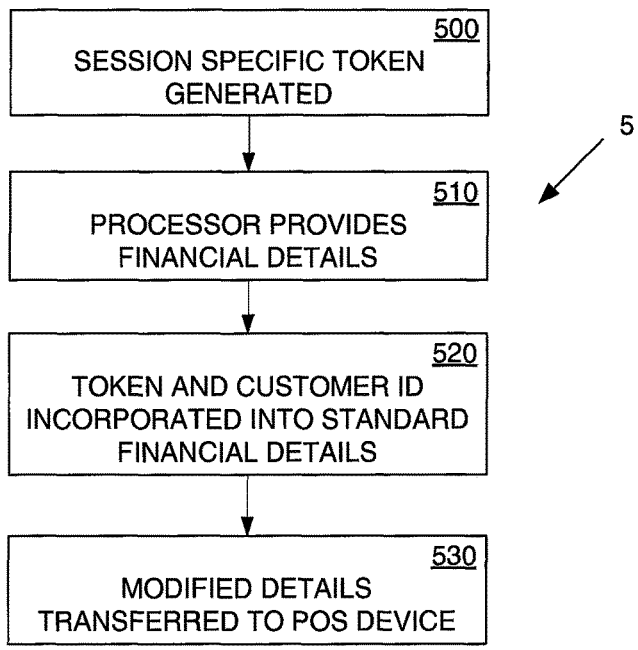
FIG. 5 is a flow diagram of an embodiment of a method performed on the mobile device of FIG. 2 in accordance with the present invention.

A method performed on the mobile device for providing financial details is illustrated in the flow diagram (5) shown in FIG. 5. The method is performed on a mobile device as illustrated in FIG. 2 and the reference numerals for the components of FIG. 2 are used.

In a first step (500), a session specific token is generated on the token generating component (210) of the mobile device. It is envisaged that the mobile device will only generate a session-specific token upon a request from the user to do so.

To generate the token, the token generating device uses an algorithm which is stored on the token generating component (210) in the HSM (200). The algorithm requires a seed value as input, the seed being unique to the user (110). The seed value is stored in the memory module (220). The algorithm further requires a dynamic key as an input value. In the present embodiment, the dynamic key used is a counter value which is also stored on the memory module.

After each determination of a session-specific token using the algorithm and dynamic key, the counter is increased. The initial counter value and the seed value of a user are known by the issuing authority (130).

In a next step (510), the processor (230) provides financial details relating to a payment card of the user, in the present embodiment payment card details in the form of Track 2 data may be stored in the memory module (210).

In a next step (520), the session specific token is incorporated into data fields of the Track 2 data which is available for a part of the account number and the CVV and, optionally, the expiry date. In the present embodiment, these fields are not essential for the transfer of payment credentials, and may be considered redundant. In the present embodiment, three characters of the session-specific token are incorporated in a last part (407), before the check digit (403), of the account number field (402), and three characters are incorporated in the CVV field (405).

A first part (406) of the account number field (402) is used to transmit the customer ID number, which is stored in and retrieved from the memory module (220). In combination, the last part (407) of the account number field and the CVV field (405) provide space for a 6-digit token to be inserted. The result of the incorporated of the session-specific token and the customer ID number into the Track 2 data is a modified form of the financial details.

In a final step (530), the modified form of the financial details is transferred to a POS terminal that is still in a format compatible with the POS terminal. In effect, certain numeric characters in the Track 2 data have been altered.

The point of sale device transmits the modified form of the financial details received to the issuing authority (130) in a similar manner as is currently known for transactions involving a physical payment card. The modified form of the financial details is sent along with details of the transaction, including, for example, the price payable and a merchant identifier, as is common practice in payment systems using POS terminals. The BIN number (401) indicates to the POS terminal to which issuing authority the details are to be sent.

Figure 6:
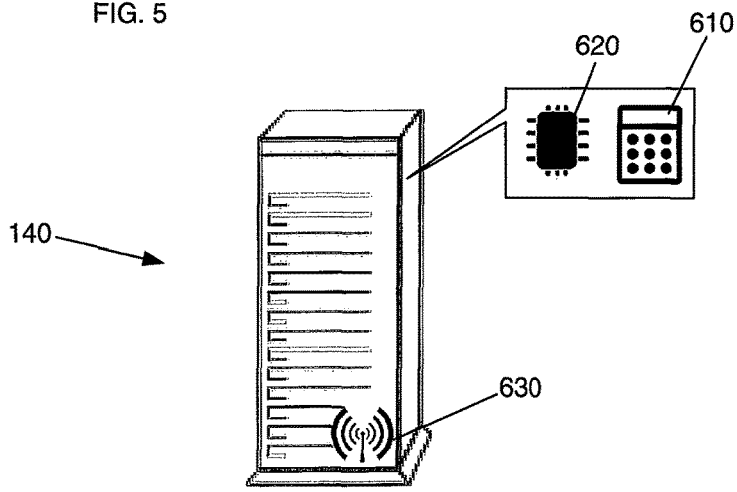
FIG. 6 is an embodiment of a server of the system of FIG. 1 in accordance with the present invention.

An embodiment of the server (140) of FIG. 1 is shown in more detail in FIG. 6. The server (140) includes a token generating component (610), an extraction component, and a comparison component. In the present embodiment, the extraction component and the comparison component are provided by a processor (620). The server also has a communication component (630) by means of which data can be sent and received. The communications component functions as both a receiving component and a transmission component, for receiving and transmitting data.

Figure 7:
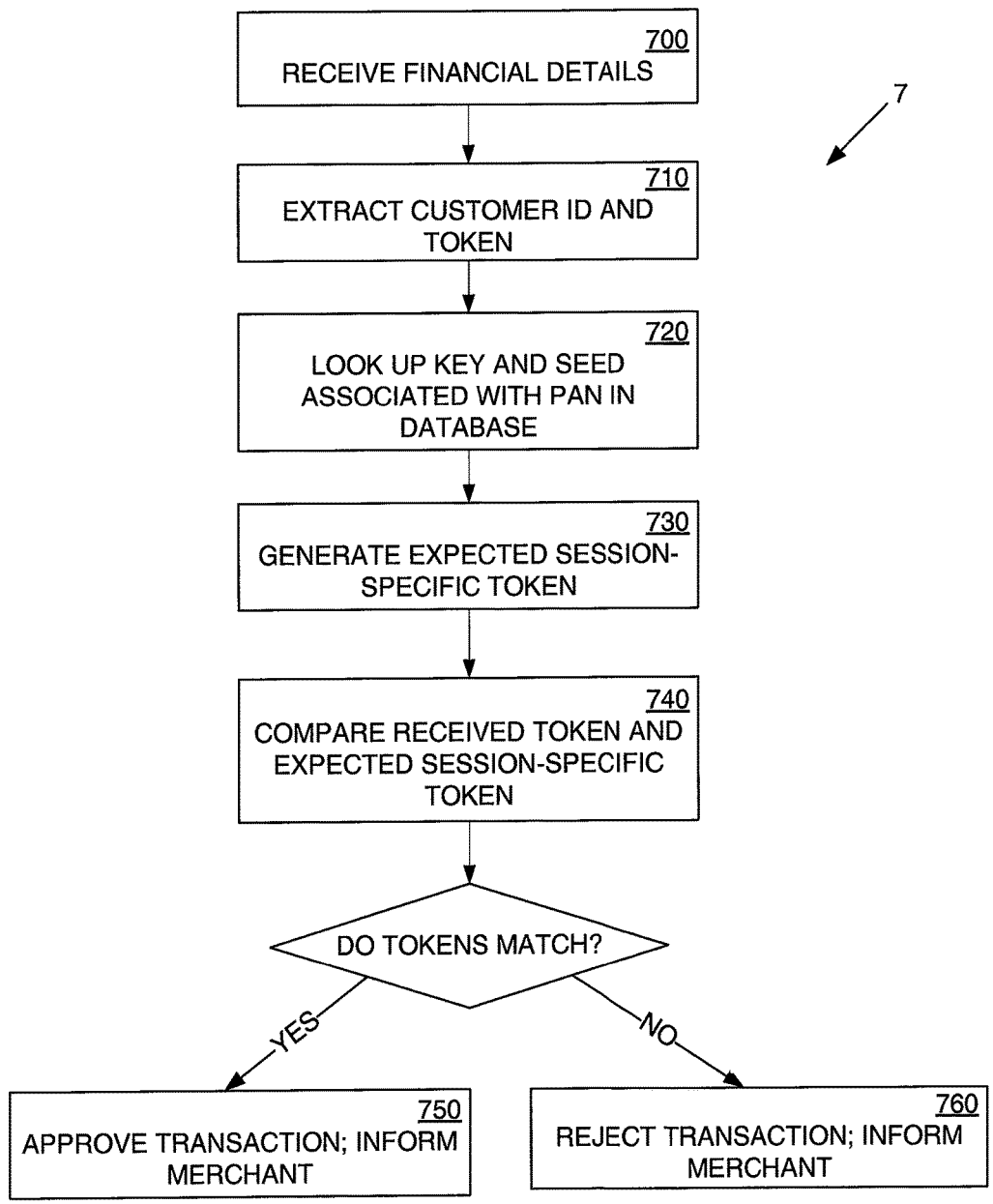
FIG. 7 is a flow diagram of an embodiment of a method in accordance with the present invention performed on the server of FIG. 6.

A flow diagram (7) illustrating the method followed by the server (140) of a issuing authority in determining the validity of received financial details in accordance with an embodiment of the invention is illustrated in FIG. 7. In a first step (700), the issuing authority receives financial details in an expected format. In the present embodiment, the expected format is a modified form of the Track 2 data as described above.

Since a customer ID number is contained in the first part (407) of the account number field (402) in an unaltered form, the server can extract the customer ID number directly from the details received in a next step (710). Since the fields in which a session-specific token should be included are also known to the issuing authority, a token is also extracted by the server in this step (710) from the last part (406) of the account number field (402) and the CVV field (405).

The database (150) has stored thereon a list containing the details of user accounts, including the customer ID number of each user account and the counter value and seed value associated with each user account. The counter value and seed are retrieved by the server in a next step (720), by looking up the key and seed associated with the customer ID number extracted from the financial details received in the previous step (710).

In a next step (730), the server applies an algorithm related to the algorithm that is stored on the memory module (220) of the HSM (200) on the user's mobile device (100), using the seed value and counter value retrieved from the database (150), to obtain an expected session-specific token. The server utilizes its token-generating component (710) for calculating expected session-specific tokens.

The server then compares the expected session-specific token to the received token in a next step (740). If the tokens match, the transaction is approved, and an approval message is transmitted to the merchant in a final step (750) via the communication component (730). If the tokens do not match, the transaction is rejected, and a rejection or failure message is transmitted to the merchant in a final step (760) via the communication component (730). If the transaction is approved, the server is expected to deal with the transfer of money in a standard manner. After a successful comparison, the counter value stored in the database relating to the user account concerned is increased in the same manner as it would have occurred on the user's mobile device when then session-specific key was originally generated. The approval or rejection message may also be sent to the user's mobile device.

It is envisaged that the seed value may constitute the dynamic key itself. In such a situation, only the dynamic key will be used as input value for generating a session-specific token, and the server will only need to look up the dynamic key to generate the same token instead of looking up the dynamic key and the seed value.

It should be noted that in the embodiment described above, the session-specific token is generated without a direct communication channel to the issuing authority. Therefore, the token generation can be considered as offline token generation, wherein the validity of the token can be assessed by the issuing authority at a later stage.

In another embodiment of the invention, both the HSM and the database have a set of pre-calculated keys which can be used to generate a session-specific token. In such an embodiment, a section of the Track 2 data field can be used to indicate which of these keys have been used by the token generating component to generate the specific token, in effect by using a key serial number. For example, if there are ten different tokens, a single digit, with numerals 0 to 9, can be used to indicate which of the keys have been used in the encryption process. It should be noted that this digit must not be encrypted in the modified form of the financial details if it is transmitted as part of the modified form of the payment credentials. The server can then look up the key used in the database, using the serial number of the key received. Alternatively, the key used can be based on a counter value, and the token generating component will use the different keys in a standard format or according to another algorithm, both being determinable by the issuing authority's token generating component by looking the values up in its associated database. A key that changes in this manner can also be described as a dynamic key.

In the embodiment described above, tokens will need to be validated by an issuing authority in the order in which they are generated by the token generating component on the mobile device. If a generated token does not reach the issuing authority, the counter on the mobile device and the counter in the database will be out of sync, and a token generated at the server will not be the same as a token received from the POS terminal. It is envisaged that in at least some embodiments, the server will test the validity by applying a counter increased by, for example, three times' use. In such an embodiment, the server will compensate for a delay in tokens received. The server may be configured to inform the user if the counter values at the mobile device and server are suspected to be out of sync in this manner.

Also in the embodiment described above, the session-specific token has been included in redundant characters of the Track 2 data; however, it is also envisaged that some of the characters may be encrypted, either by means of a one-way hash function, an RSA token, or indeed any cryptographic function that renders a different result upon every operation performed with differing input values. A person skilled in the art would appreciate that there are indeed a large variety of cryptographic functions that can perform such a function.

It is further envisaged that the expiry date field (404) may be used as another field in which characters of the session-specific key may be stored. However, it should be noted that a POS terminal may automatically reject financial details if the details are in an invalid format, or in a format that will constitute a date that has passed, or a date that is too far in the future. Typically, any date more than 4 years in the future will be rejected. Similarly, any month field that is not from 01 to 12 will be invalid, and any day field that is not from 1 to 31 will be invalid. Some POS devices may also reject a day field if the relevant month does not have that many days, for example the second month, February, or 02, cannot have 30 days. Including the expiry date field as a field in which characters of a session-specific token may be stored will increase the possible length of the token, although the specific characters that may be used or which may be used together are limited. Any system which makes use of the expiry date field should be configured to only include acceptable characters in this field.

Figure 8:
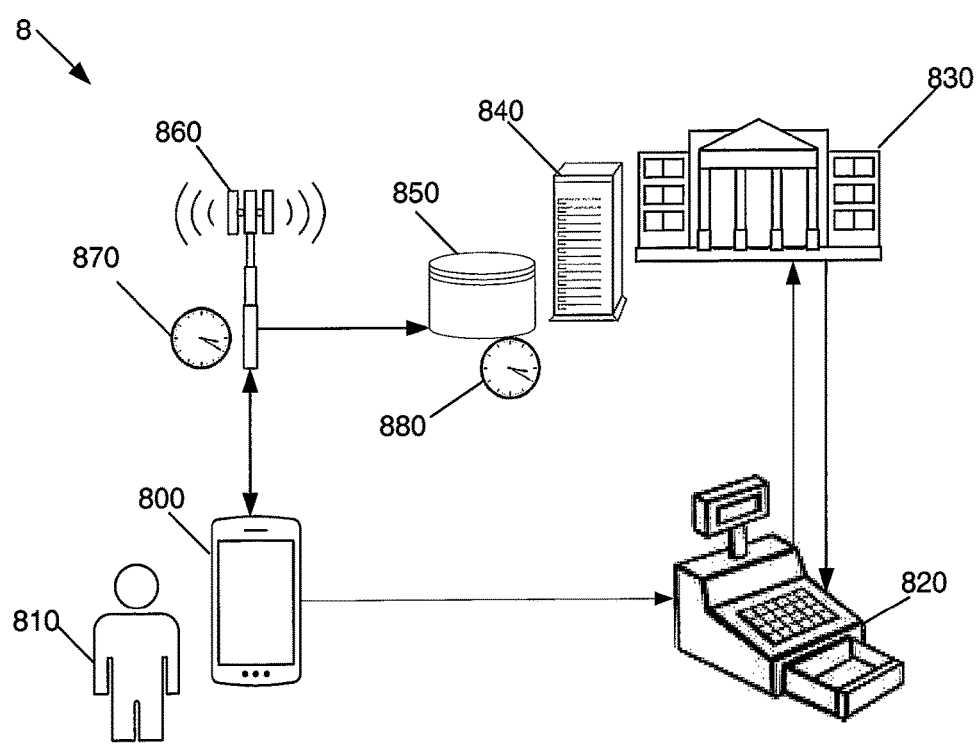
FIG. 8 is an embodiment of a system for providing financial details from a mobile device in accordance with a further embodiment of the invention.

FIG. 8 shows an embodiment of a system (8) in which the dynamic key is time-based, instead of based on counter value as described above. This may be referred to as "time-based encryption". The system includes a mobile device (800) of a user (810), a point of sale terminal (820) of a merchant, and an issuing authority (830). The financial system has associated therewith a server (840) and a database (850). In the present embodiment, as in the embodiment described with reference to FIG. 1, the mobile device is a smartphone. The mobile device (800) is in communication with a mobile base station which has a clock (870). The database (850) also has a clock (880) which is synchronized with the clock (870) of the base station.

Modern smartphones, and indeed the mobile device (800) of the present embodiment, are able to retrieve the current time from a clock at a mobile base station. Accordingly, upon the device being requested to generate a session-specific token, the mobile device (800) obtains the time from the clock (870) of the base station (860). At least a part of this time is used as a dynamic key for an input value in the algorithm, negating the need for a counter value as dynamic key. In the present embodiment, the hours and minutes of the current time is used as an input value. The session-specific token obtained from application of the algorithm is then handled in exactly the same way as described above, in that the token replaces some of the characters in financial details in a standard format that is stored on the HSM, and the modified financial detail is transferred to a POS terminal. Similarly, a customer ID number is included in the modified format as well. The modified financial details format is identical to the format described with reference to FIG. 4. The POS terminal transfers the modified financial details to the issuing authority as described above.

Figure 9:
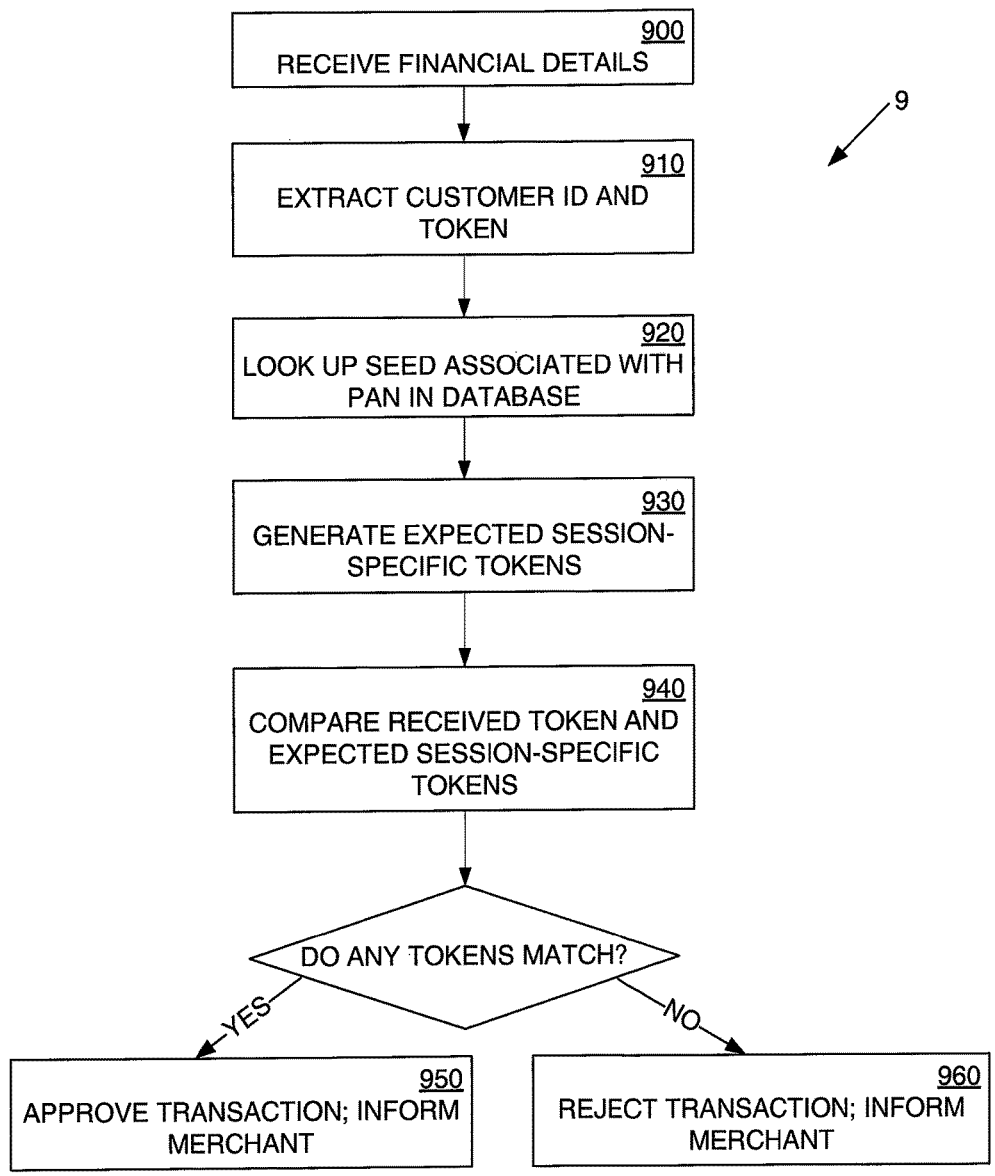
FIG. 9 is a flow diagram of an embodiment of a method in accordance with the present invention performed at the server of the system of FIG. 8.

A method of determining the validity of the credentials received by the server (940) in accordance with the present embodiment of a time-based dynamic key is illustrated by the flow diagram (9) shown in FIG. 9. In a first step (900), the issuing authority receives financial details in an expected format. In the present embodiment, the expected format is a modified form of the Track 2 data as described above. The inclusion of the BIN in the modified form of the Track 2 data in an unaltered, standard format allowed the POS terminal (820) to transmit the data to an appropriate issuing authority (830).

Since a customer ID number is contained in the first part (407) of the account number field (402) in an unaltered form, the server can extract the customer ID number directly from the details received in a next step (910). Since the fields in which a session-specific token should be included are also known to the issuing authority, a token is also extracted by the server in this step (910) from the last part (406) of the account number field (402) and the CVV field (405).

The database (750) has stored thereon a list containing the details of user accounts held at the issuing authority, including the customer ID number of each user account and the counter value associated with each user account. The seed value is retrieved by the server in a next step (920), by looking up the seed associated with the customer ID number extracted from the financial details received in the previous step (900).

In a next step (930), the server applies an algorithm related to the algorithm that is stored on the memory module (220) of the HSM (200) on the user's mobile device (100), using the seed value retrieved. The server has a token-generating component associated therewith which is similar to the token-generating component (210) of the HSM (200) for calculating expected session-specific tokens. The server also uses the time of its clock (780), which is synchronized with the clock (770) of the mobile base station (760), as input value, in order to obtain an expected session-specific token. As with the generation of the original session-specific token, the hours and minutes of the current time is used. In the present embodiment, the lifetime of a session-specific key is ten minutes, and the server also generates expected tokens for the previous ten minutes. As only the current hour and minutes are used as input values, and not the seconds, ten expected tokens need to be determined for a session-specific token lifetime of ten minutes.

The server then compares the ten expected session-specific tokens to the received token in a next step (940). If the received token matches any of the expected tokens, the transaction is approved, and an approval message is transmitted to the merchant in a final step (950). If none of the expected tokens match the received token, the transaction is rejected, and a rejection or failure message is transmitted to the merchant in a final step (960). If the transaction is approved, the server is expected to deal with the transfer of money in a standard manner. It should be noted that since there is no counter value present, no alterations need to be made to the database after successful completion of a transaction.

Although it has only be described that the hour and minutes are used as input values for the time-based encryption described above, other elements of time may also be used. For example, the day, month or year of the current time may all be used, or even the seconds, milliseconds, or the like, as input values. It should be noted that the inclusion of these elements may increase the amount of expected session-specific tokens to which a received token need to be compared, depending on the lifetime of a session-specific token. For example, a session-specific token which is valid for 2 minutes and which uses seconds of time as input value to the algorithm, as there are 120 seconds in two minutes.

Figure 10:
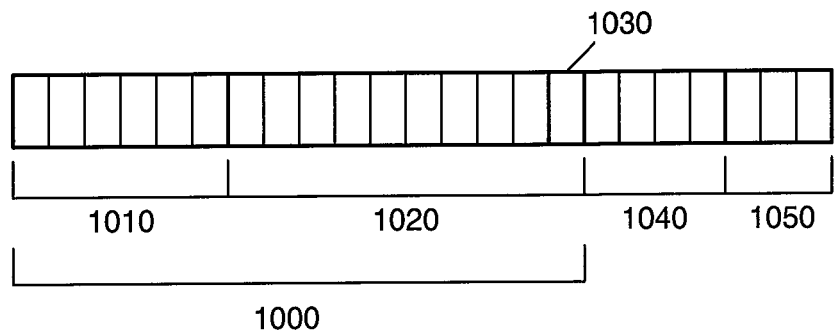
FIG. 10 is a second example of a financial detail structure used in a method of operation of the mobile device of FIG. 2.
Figure 11:
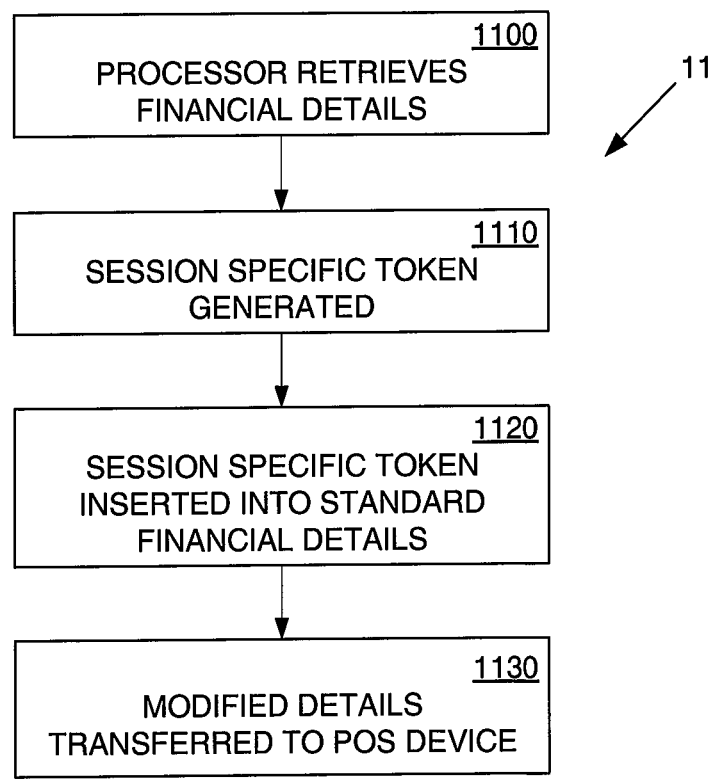
FIG. 11 is a flow diagram of an embodiment of a method in accordance with the present invention performed on the mobile device of FIG. 2 and using the financial detail structure of FIG. 10.

In FIG. 10, the example of data forming part of Track 2 data as shown in FIG. 4 is repeated. The data includes a personal account number (PAN) field (1000), which is made up of a bank identification number (BIN) field (1010) of 6 characters and an account number field (1020) of the user, of 10 characters. The account number includes a check digit (1030) of a single character. Also included in the Track 2 data is an expiry date field (1040) of 4 characters and a card verification value (CVV) field (1050) of 3 characters. It should be noted that FIG. 10 only shows an extract of the data fields in Track 2 data, and that the actual format includes various other fields, such as field separators, initialization fields, a termination field, as well as other data fields. In the present embodiment, all HSM modules issued by a specific issuing authority have the same algorithm stored thereon. This data is, however, modified differently to the data that was described with reference to FIG. 4. A flow diagram illustrating an alternative method performed on the mobile device of FIG. 2 is shown in FIG. 11. The mobile device forms part of the same system (1) that was described above with reference to FIG. 1.

In a first step (1100), the processor (230) provides financial details relating to a payment card of the user, in the present embodiment again payment card details in the form of Track 2 data may be stored in the memory module (220) of the HSM (200).

In a next step, the token generating component (1110) generates a session-specific token of up to 9 characters long, using an encryption algorithm to encrypt a customer identification number with input values including a seed value and a dynamic key. The algorithm also uses an initialization vector (IV) as input value. In the present embodiment, the IV may be a random one-time CVV value, which is determined by the token generating component (210) prior to generating the session-specific token. The algorithm and seed value is stored on the memory module (220), and are linked to the specific issuing authority which is to approve or reject the transaction. The customer identification number may also be stored on the memory module (220).

In the present embodiment of the invention, every user which has a financial account at a specific issuing authority and who makes use of the system and method of the invention is in possession of the same key and a corresponding decryption algorithm.

The up to 9 characters of the session-specific token is inserted into the account number field (1020) not including the check digit (1030) field, and the random CVV value, which is also the IV, is inserted into the CVV field (1050) in a next step (1120), to arrive at a modified form of the financial details. In a final step (1130), the modified financial details are transmitted to the POS device (120).

The point of sale device transmits the modified form of the financial details received to the issuing authority (130) in a similar manner as is currently known for transactions involving a physical payment card. The modified form of the financial details is sent along with details of the transaction, including the price payable and a merchant identifier, as is currently known. The BIN number indicates to the POS terminal to which issuing authority the details are to be sent.

Figure 12:
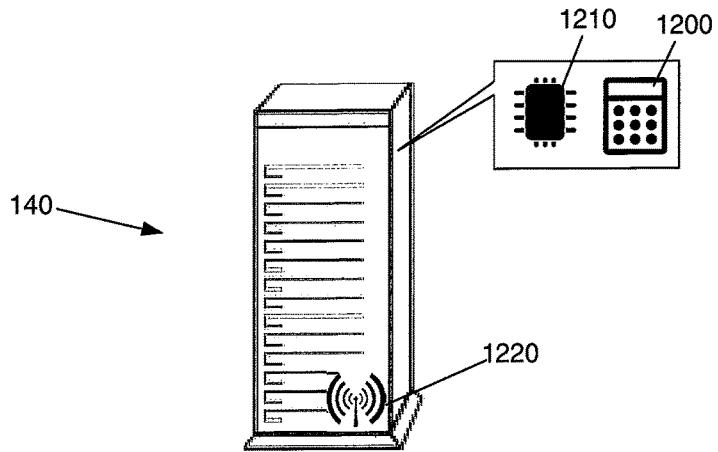
FIG. 12 is an embodiment of a server of the system of FIG. 1 in accordance with the present invention.

A further embodiment of the server (140) of FIG. 1 is shown in more detail in FIG. 12. The server includes an extraction component, a comparing component, and a token decryption component (1200). In the present embodiment, the extraction component and the comparing component are provided by a processor (1210). The server also has a communication component (1220) by means of which data can be sent and received. The communications component functions as both a receiving component and a transmission component, for receiving or transmitting data.

Figure 13:
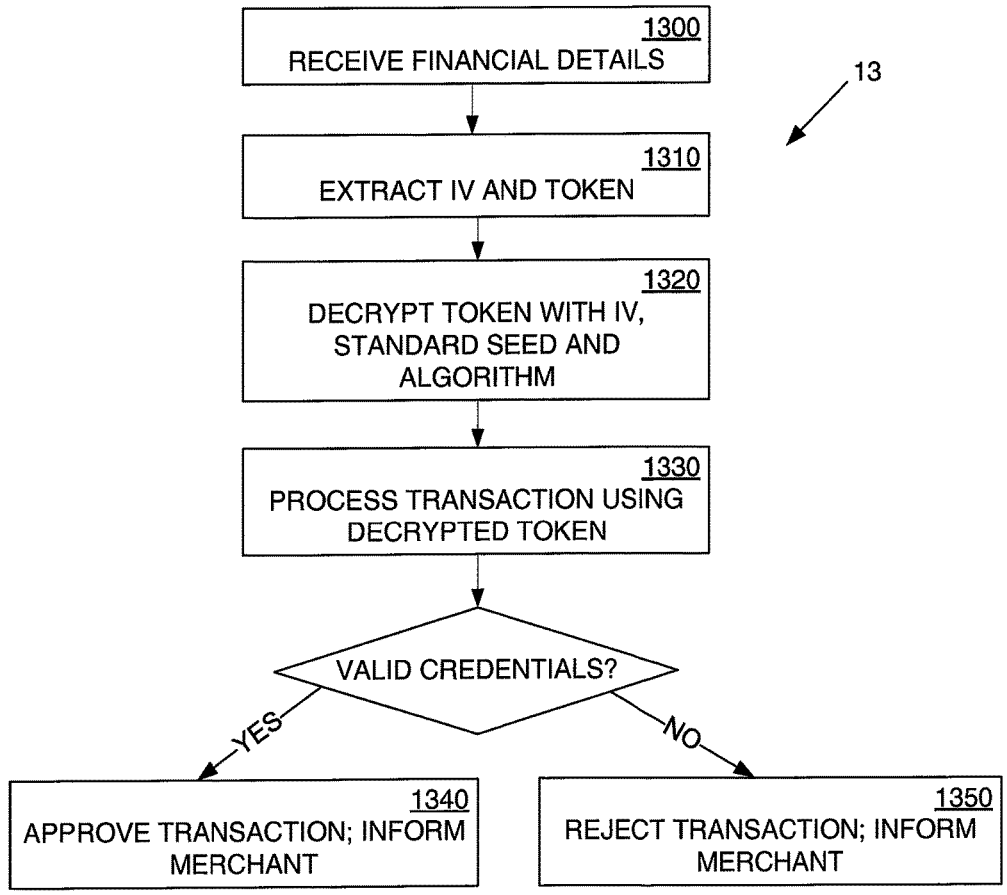
FIG. 13 is a flow diagram of an embodiment of a method in accordance with the present invention performed at the server of FIG. 12.

A flow diagram (13) illustrating the method followed by the server (140) of an issuing authority in determining the validity of received financial details in accordance with the present embodiment of the invention is illustrated in FIG. 13. In a first step (1300), the issuing authority receives financial details in an expected format via the communication component (1220). In the present embodiment, the expected format is a modified form of the Track 2 data as described above.

Since every modified form of financial details received by an issuing authority is expected to have been encrypted with the same algorithm and seed value, a related same decryption algorithm and seed value can be used by the server to decrypt any received modified financial details.

In a next step (1310), the server extracts the IV from the CVV field and the token from the account number field with the processor (1210). In combination with the standard seed and algorithm, the IV is used to decrypt the token in the account number field, using the decryption component (1200) to extract the customer identification number in a next step (1320).

The transaction is then processed in the normal manner in a next step (1330), using the result of the decryption algorithm. If the credentials obtained using the decryption algorithm is valid, the transaction is approved, and an approval message is transmitted to the relevant merchant in a final step (1340), using the communication component (1220). If the credentials are not valid, the transaction is rejected, and a rejection or denial message is transmitted to the merchant in a final step (1350) using the communication component (1220).

It is envisaged that different algorithms may be stored on a memory module of the HSM, with each algorithm being coupled to a specific issuing authority. By selecting a specific set of financial details to use in a transaction, the HSM will use the appropriate set of details in order to produce a session-specific token with an algorithm that the specific issuing authority can decrypt or interpret.

It should also be noted that the providing of the financial details by the mobile device may be facilitated by a computer program product, such as an application or a program, operating on the mobile device. The computer program product will typically need to be stored in a computer-readable medium in the form of a computer-readable program code, and will be configured to enable the performance of the method on the mobile device as described earlier with reference to FIG. 5 and FIG. 11. Similarly, the determining of the validity of financial details on the server may be facilitated by a computer program product, such as an application or a program, operating on the server. The computer program product will typically need to be stored in a computer-readable medium in the form of a computer-readable program code, and will be configured to enable the performance of the method on the server as described earlier with reference to FIG. 6 and FIG. 12.

In at least one embodiment of the invention, the financial details are not stored on a memory element (220) of the mobile device, and are rather obtained from the issuing authority. These financial details may be one-time use financial details, often referred to as one-time personal account numbers. These one-time use financial details may then be encrypted or modified as explained above. In such an instance, the server may be configured to remember which user has requested the one-time use financial details, and check when receiving financial details that the user from which the details appear to originate has in actual fact request credentials. This may provide additional security to a user wishing to use the systems and methods described.

Figure 14:
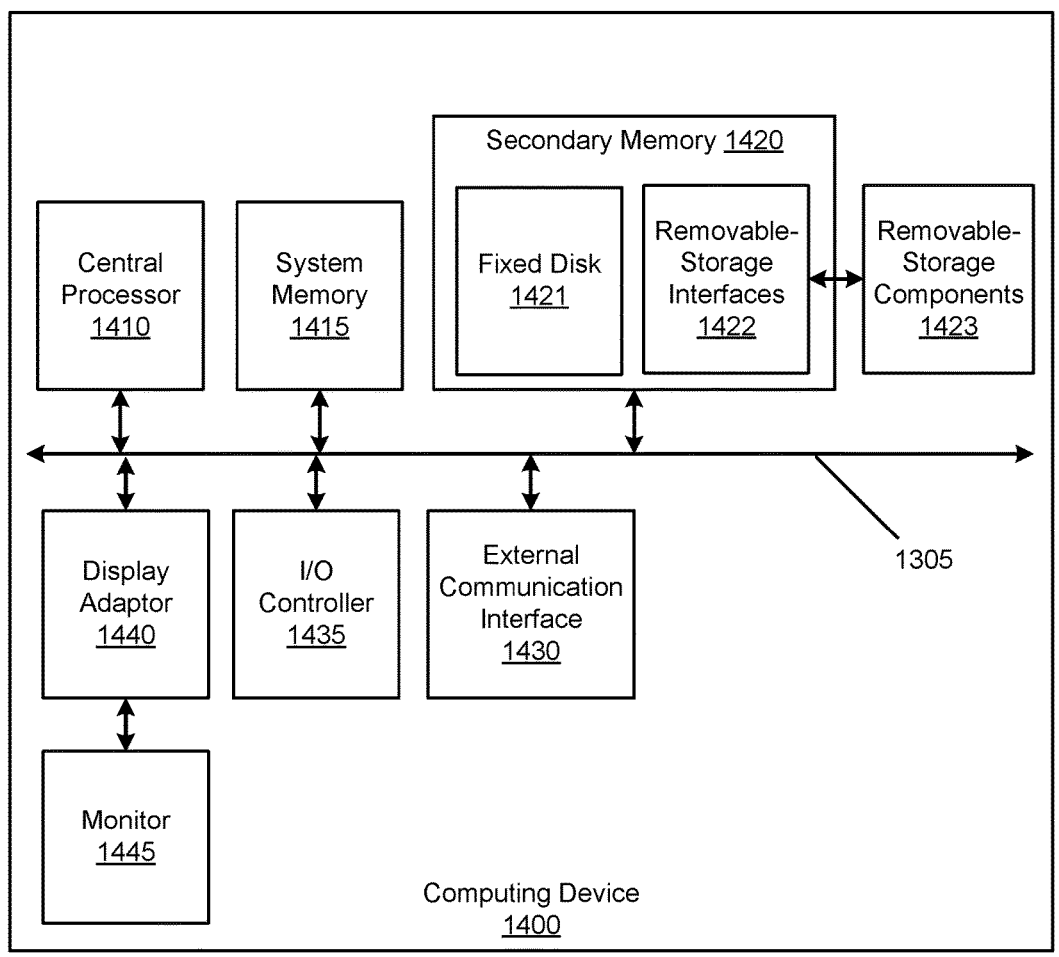
FIG. 14 is an embodiment of a computing device in accordance with the present invention.

FIG. 14 illustrates an example of a computing device (1400) in which various aspects of the disclosure may be implemented. The computing device (1400) may be suitable for storing and executing computer program code. The various participants and elements in the previously described system diagrams may use any suitable number of subsystems or components of the computing device (1400) to facilitate the functions described herein.

The computing device (1400) may include subsystems or components interconnected via a communication infrastructure (1405) (for example, a communications bus, a cross-over bar device, or a network). The computing device (1400) may include at least one central processor (1410) and at least one memory component in the form of computer-readable media.

The memory components may include system memory (1415), which may include read only memory (ROM) and random access memory (RAM). A basic input/output system (BIOS) may be stored in ROM. System software may be stored in the system memory (1415) including operating system software.

The memory components may also include secondary memory (1420). The secondary memory (1420) may include a fixed disk (1421), such as a hard disk drive, and, optionally, one or more removable-storage interfaces (1422) for removable-storage components (1423).

The removable-storage interfaces (1422) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive.

The removable-storage interfaces (1422) may also be in the form of ports or sockets for interfacing with other forms of removable-storage components (1423) such as a flash memory drive, external hard drive, or removable memory chip, etc.

The computing device (1400) may include an external communications interface (1430) for operation of the computing device (1400) in a networked environment enabling transfer of data between multiple computing devices (1400). Data transferred via the external communications interface (1430) may be in the form of signals, which may be electronic, electromagnetic, optical, radio, or other types of signal.

The external communications interface (1430) may enable communication of data between the computing device (1400) and other computing devices including servers and external storage facilities. Web services may be accessible by the computing device (1400) via the communications interface (1430).

The external communications interface (1430) may also enable other forms of communication to and from the computing device (1400) including, voice communication, near field communication, Bluetooth, etc.

The computer-readable media in the form of the various memory components may provide storage of computer-executable instructions, data structures, program modules, and other data. A computer program product may be provided by a computer-readable medium having stored computer-readable program code executable by the central processor (1410).

A computer program product may be provided by a non-transient computer-readable medium, or may be provided via a signal or other transient means via the communications interface (1430).

Interconnection via the communication infrastructure (1405) allows a central processor (1410) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (1400) either directly or via an I/O controller (1435). These components may be connected to the computing device (1400) by any number of means known in the art, such as a serial port.

One or more monitors (1445) may be coupled via a display or video adapter (1440) to the computing device (1400).

Figure 15:
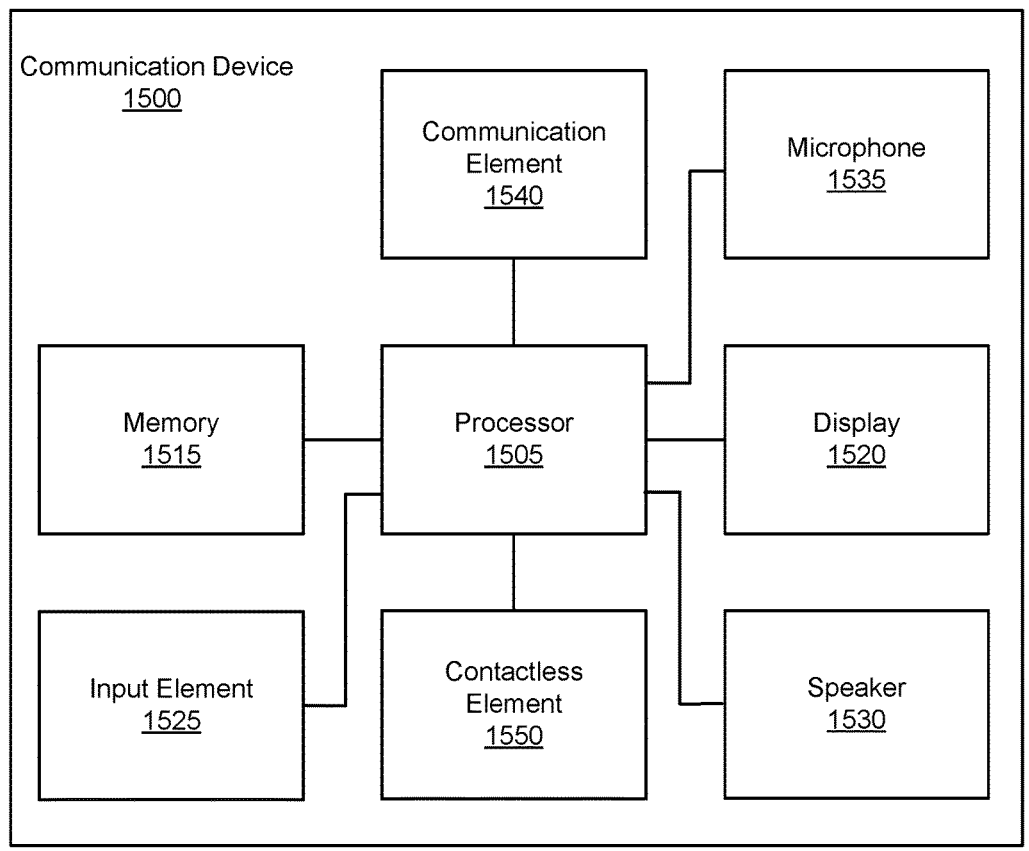
FIG. 15 is an embodiment of a block diagram of a communication device in accordance with the present invention.

FIG. 15 shows a block diagram of a communication device (1500) that may be used in embodiments of the disclosure. The communication device (1500) may be a cell phone, a feature phone, a smart phone, a satellite phone, or a computing device having a phone capability.

The communication device (1500) may include a processor (1505) (e.g., a microprocessor) for processing the functions of the communication device (1500) and a display (1520) to allow a user to see the phone numbers and other information and messages. The communication device (1500) may further include an input element (1525) to allow a user to input information into the device (e.g., input buttons, touch screen, etc.), a speaker (1530) to allow the user to hear voice communication, music, etc., and a microphone (1535) to allow the user to transmit his or her voice through the communication device (1500).

The processor (1510) of the communication device (1500) may connect to a memory (1515). The memory (1515) may be in the form of a computer-readable medium that stores data and, optionally, computer-executable instructions.

The communication device (1500) may also include a communication element (1540) for connection to communication channels (e.g., a cellular telephone network, data transmission network, Wi-Fi network, satellite-phone network, Internet network, Satellite Internet Network, etc.). The communication element (1540) may include an associated wireless transfer element, such as an antenna.

The communication element (1540) may include a subscriber identity module (SIM) in the form of an integrated circuit that stores an international mobile subscriber identity and the related key used to identify and authenticate a subscriber using the communication device (1500). One or more subscriber identity modules may be removable from the communication device (1500) or embedded in the communication device (1500).

The communication device (1500) may further include a contactless element (1550), which is typically implemented in the form of a semiconductor chip (or other data storage element) with an associated wireless transfer element, such as an antenna. The contactless element (1550) may be associated with (e.g., embedded within) the communication device (1500) and data or control instructions transmitted via a cellular network may be applied to the contactless element (1550) by means of a contactless element interface (not shown). The contactless element interface may function to permit the exchange of data and/or control instructions between mobile device circuitry (and hence the cellular network) and the contactless element (1550).

The contactless element (1550) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device (1500) and an interrogation device. Thus, the communication device (1500) may be capable of communicating and transferring data and/or control instructions via both a cellular network and near field communications capability.

The data stored in the memory (1515) may include: operation data relating to the operation of the communication device (1500), personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the communication device (1500) to selected receivers.

The communication device (1500) may be, amongst other things, a notification device that can receive alert messages and access reports, a portable merchant device that can be used to transmit control data identifying a discount to be applied, as well as a portable consumer device that can be used to make payments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for providing financial details from a mobile device of a user for use in a transaction, the method being performed on the mobile device of the user and including the steps of:
   generating, on a token generating component associated with the mobile device, a session-specific token by applying an algorithm stored on the token generating component with a dynamic key, the session-specific token generated by encrypting a customer identification number using the dynamic key and a seed value unique to the user;
   retrieving, by the mobile device, financial details in a pre-determined format conforming to Track 2 data format for use in a transaction;
   incorporating the session-specific token and the financial details into a modified form of the financial details including encrypting a portion of characters of the financial details using the session-specific token by incorporating a first portion of the session-specific token before a check digit of the financial details, incorporating a second portion of the session-specific token before a CVV field of the financial details, and replacing data in an account number field with the customer identification number; and
   transferring the modified form of the financial details in the predetermined format from the mobile device to an issuing authority to initiate the transaction, the issuing authority validating the session-specific token within the modified form of the financial details before authorizing the transaction.

2. The method as claimed in claim 1, wherein incorporating the session-specific token and the financial details into a modified form of the financial details includes:
   inserting the session-specific token into redundant characters in the pre-determined format.

3. The method as claimed in claim 1, wherein the seed value unique to the user is provided by the issuing authority to the mobile device.

4. The method as claimed in claim 1, wherein the seed value unique to the user is used by the issuing authority to generate an expected session-specific token, the expected session-specific token being compared to the session-specific token when validating the session-specific token.

5. The method as claimed in claim 1, wherein the session-specific token offline from an is generated while not in communication with the issuing authority and the dynamic key is coordinated between the mobile device and the issuing authority.

6. The method as claimed in claim 5, wherein the dynamic key and one of a customer identifier or an initialization vector for a customer is used by an issuing authority to generate an expected-session-specific token to be compared to the session-specific token to authenticate the user.

7. The method as claimed in claim 1, wherein the financial details include static customer account details or one-time generated customer account details.

8. The method as claimed in claim 1, wherein the dynamic key is randomly selected from a pre-calculated set of keys; and a key serial number related to the dynamic key is transferred along with the modified form of the financial details, wherein the key serial number is able to be used to determine the dynamic key that was used.

9. The method as claimed in claim 1, wherein the dynamic key is a counter value which increments or changes every time the algorithm is applied.

10. The method as claimed in claim 1, wherein the dynamic key is based on a time signal derived by the mobile device, the time signal indicating a time at which the generation of the session-specific token is carried out.

11. The method as claimed in claim 1, wherein the token generating component is a cryptographic expansion device that can be attached to a communication component of the mobile device; and the cryptographic expansion device is configured to be used with the mobile device without requiring any changes to the internal software or hardware of the mobile device and without requiring any modification to the communication protocols used by the mobile device.

12. The method as claimed in claim 1, wherein the token generating component is a hardware security module which uses hardware to generate the session-specific token.

13. The method as claimed in claim 1, wherein validating the session-specific token by the issuing authority comprises:
identifying, by the issuing authority, the seed value unique to the user based on the customer identification number;
determining a lifetime of the session-specific token;
generating a plurality of expected session-specific tokens based on the lifetime of the session-specific token; and
comparing the session-specific token to each of the expected session-specific tokens of the plurality of expected session-specific tokens, the session-specific token being validated upon determining that the session-specific token matches one expected session-specific token of the plurality of expected session-specific tokens.

14. The method as claimed in claim 13, wherein the lifetime of the session-specific token is ten minutes and the plurality of expected session-specific tokens comprises ten expected session-specific tokens, wherein each of the plurality of expected session-specific tokens is generated to correspond to a one-minute interval of the lifetime.

15. The method as claimed in claim 1, wherein the session-specific token comprises six digits, the first portion of the session-specific token comprises a first three digits of the session-specific token, and the second portion of the session-specific token comprises a last three digits of the session-specific token.

16. A system for providing financial details from a mobile device of a user for use in a transaction, the system being provided on the mobile device of the user and including:
a token generating component associated with the mobile device for generating a session-specific token by applying an algorithm stored on the token generating component with a dynamic key, the session-specific token generated by encrypting a customer identification number using the dynamic key and a seed value unique to the user;
a financial details component for providing financial details in a pre-determined format conforming to Track 2 data format for use in a transaction;
a format modifying component for incorporating the session-specific token and the financial details into a modified form of the financial details including encrypting a portion of characters of the financial details with the session-specific token by incorporating a first portion of the session-specific token before a check digit of the financial details, incorporating a second portion of the session-specific token before a CVV field of the financial details, and replacing data in an account number field with the customer identification number; and
a communication component for transferring the modified form of the financial details in the pre-determined format from the mobile device to an issuing authority to initiate the transaction, the issuing authority being caused to validate the session-specific token within the modified form of the financial details before authorizing the transaction.

17. The system as claimed in claim 16, wherein the token generating component is a cryptographic expansion device that can be attached to a communication component of the mobile device; and the cryptographic expansion device is configured to be used with the mobile device without requiring any changes to the internal software or hardware of the mobile device and without requiring any modification to the communication protocols used by the mobile device.

18. The system as claimed in claim 17, wherein the cryptographic expansion device is a cryptographic label that includes a hardware security module (HSM) disposed therein including a secure processing unit and a public processing unit.

19. The system as claimed in claim 16, wherein the token generating component is a hardware security module which uses hardware to generate the session-specific token.

20. A computer program product for providing financial details from a mobile device of a user for use in a transaction, the computer program product comprising a computer-readable medium having stored computer-readable program code for performing the steps of:
generating, on a token generating component associated with the mobile device, a session-specific token by applying an algorithm stored on the token generating component with a dynamic key, the session-specific token generated by encrypting a customer identification number using the dynamic key and a seed value unique to the user;
providing financial details in a pre-determined format conforming to Track 2 data format for use in a transaction;
incorporating the session-specific token and the financial details into a modified form of the financial details including encrypting a portion of characters of the financial details with the session-specific token by incorporating a first portion of the session-specific token before a check digit of the financial details, incorporating a second portion of the session-specific token before a CVV field of the financial details, and replacing data in an account number field with the customer identification number; and transferring the modified form of the financial details in the predetermined format from the mobile device to an issuing authority to initiate the transaction, the issuing authority validating the session-specific token within the modified form of the financial details before authorizing the transaction.

* * * * *

UNITED STATES PATENT AND TRADEMARK OFFICE
CERTIFICATE OF CORRECTION

PATENT NO. : 10,304,047 B2
APPLICATION NO. : 14/648510
DATED : May 28, 2019
INVENTOR(S) : Horatio Nelson Huxham et al.

Page 1 of 1

It is certified that error appears in the above-identified patent and that said Letters Patent is hereby corrected as shown below:

In the Claims

In Column 19, Line 1-2 please remove "session-specific token offline from an is generated" and insert -- session-specific token is generated --

Signed and Sealed this
Twenty-ninth Day of October, 2019

Andrei Iancu
*Director of the United States Patent and Trademark Office*